J. L. SKELDON.
POWDER GUN.
APPLICATION FILED NOV. 11, 1920.
1,406,233.
Patented Feb. 14, 1922.
2 SHEETS—SHEET 1.
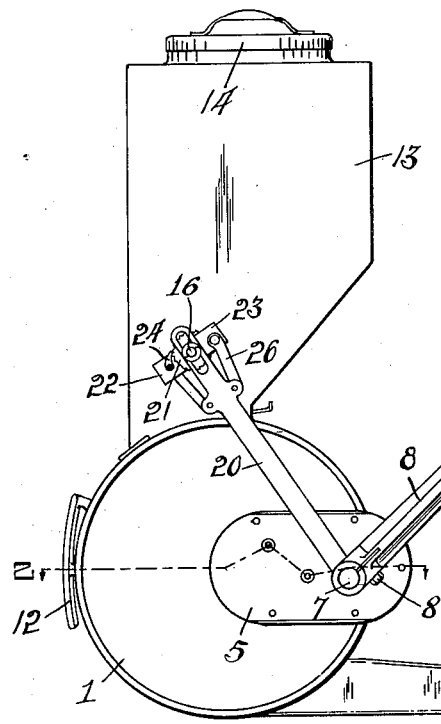
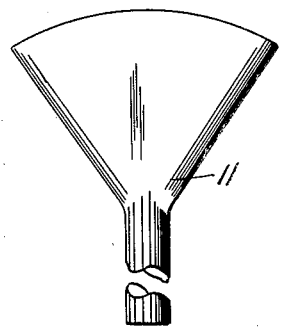
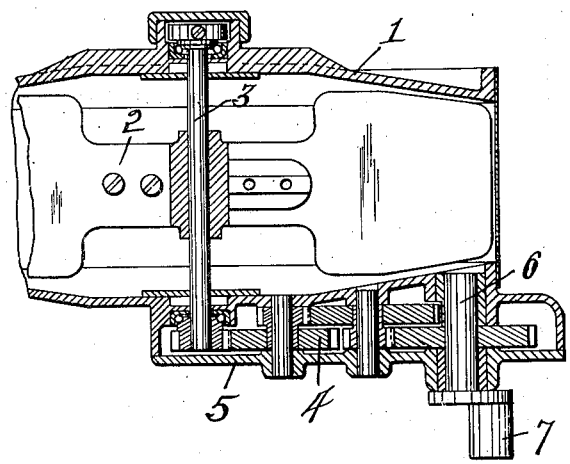
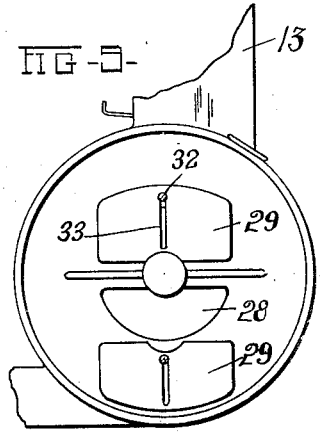
INVENTOR
Joseph L. Skeldon.
By Owen Owen & Crampton.
His attys.

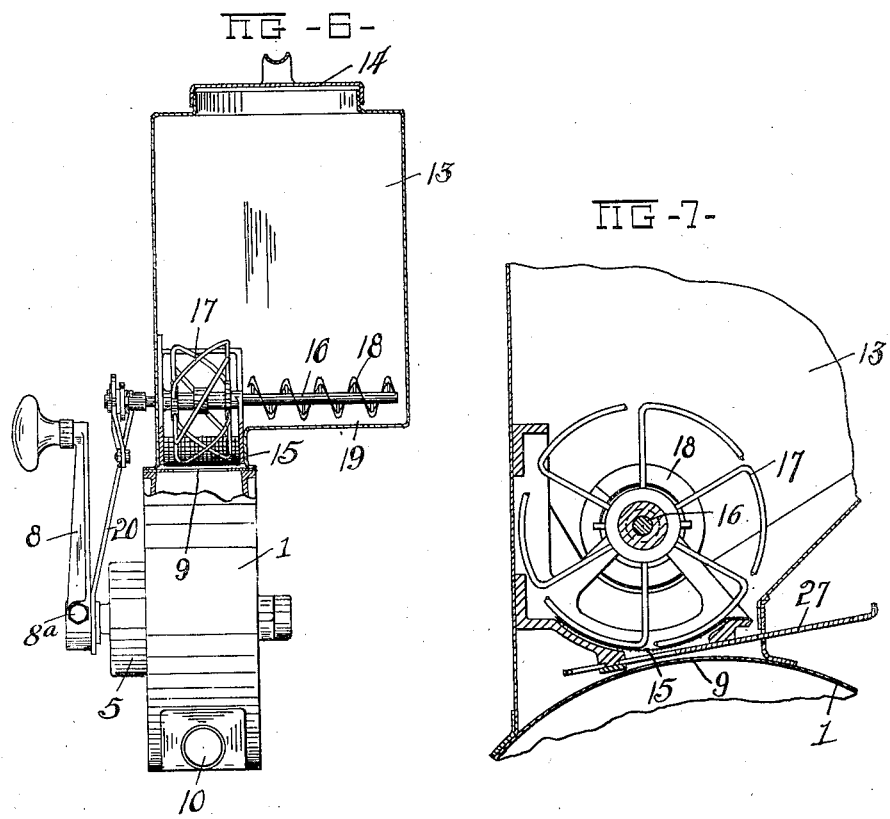

UNITED STATES PATENT OFFICE.

JOSEPH L. SKELDON, OF TOLEDO, OHIO, ASSIGNOR TO JOSEPH L. SKELDON ENGINEERING COMPANY, OF TOLEDO, OHIO, A CORPORATION OF OHIO.

POWDER GUN.

1,406,233.

Specification of Letters Patent.

Patented Feb. 14, 1922.

Application filed November 11, 1920. Serial No. 423,265.

*To all whom it may concern:*

Be it known that I, JOSEPH L. SKELDON, a citizen of the United States, and a resident of Toledo, in the county of Lucas and State of Ohio, have made an Invention Appertaining to Powder Guns; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to apparatus for use more particularly to discharge a powder in spray form on plants or the like to destroy insects, worms and other destructive agents thereon; and has for its object the provision of an improved apparatus of this character whereby to enhance the efficiency and commercial value thereof.

The invention is fully described in the following specification, and while in its broader aspect it is capable of embodiment in numerous forms, a preferred embodiment thereof is illustrated in the accompanying drawings, in which, Figure 1 is a side elevation of an apparatus embodying the invention. Fig. 2 is an enlarged fragmentary cross section thereof on the line 2—2 in Fig. 1, with the operating crank removed. Figs. 3 and 4 are different views of the discharge nozzle with parts broken away. Fig. 5 is an opposite side view of the device to that shown in Fig. 1, with portions broken away. Fig. 6 is a front elevation of the apparatus with the upper portion in vertical section and with the spout removed. Fig. 7 is an enlarged fragmentary sectional detail of the feed means in the bottom of the powder container. Figs. 8 and 9 are different enlarged views of the upper end portions of the ratchet drive means for the feed shaft, and Fig. 10 is a fragmentary side view of the apparatus showing the bottom formation of the powder container.

Referring to the drawings, 1 designates a fan housing of cylindrical form containing a fan or blower 2 carried centrally therein by a shaft 3, which is journaled in the sides of the housing. The outer end of the shaft 3 is connected by a train of gears 4, disposed within a case 5, to a crank shaft 6 disposed at the forward portion of the housing 1 and having at its outer end a crank receiving stud 7 which is eccentrically disposed with respect to the shaft axis. An operating crank 8 is mounted on the stud 7 for rotary adjustment relative thereto so that the length of projection of the crank arm from the axis of the shaft 6 may be varied by a revoluble adjustment of the crank arm on the stud, as is apparent. The crank-arm is clamped in position on the stud 7 by the screw 8ª. The fan housing 1 has an inlet opening 9 at its top and a discharge tube 10 projecting forward from its bottom portion and adapted to be fitted with a discharge nozzle 11, which is shown, in the present instance, as having its outer end of fan shape to effect a discharge of powder in broad fan form therefrom. The housing is also provided at its rear side with a breast plate 12 for bearing against the front side of the trunk portion of a person carrying the same.

A container 13 for the powder being sprayed is mounted on the top of the fan housing 1, being rectangular in form, in the present instance, and considerably broader than the housing. The container is provided in its top with a filling opening, closed by a removable cover 14, and in its bottom at the side thereof over the receiving opening 9 of the housing with a registering discharge opening having a screen 15 across the same.

A feed-shaft 16 is journaled in the lower portion of the container 13 crosswise thereof over its bottom discharge opening and carries an agitating wheel 17 over the screen 15, in position to rub against the screen and tend to keep the same free from clogging and to assist in feeding the powder therethrough from the container. The screen 15 is of arcuate form to conform to the peripheral portion of the feed wheel with which it engages. The wheel 17 is formed, in the present instance, of wire having portions extending in spiral form across the periphery thereof, as shown. The feed shaft 16 carries a feed worm 18 within the bottom portion of the container which projects beyond the side of the housing 1 so that powder in such bottom portion of the container will be fed laterally to the discharge opening thereof upon a turning of the shaft. To facilitate the feeding action of the worm the bottom portion of the container in which it works is made in trough form, as shown at 19 in Fig. 10.

The feed shaft 16 is driven from the eccentric stud 7, the connecting actuating means including an eccentric bar 20 which has a reciprocatory movement imparted thereto upon a turning of the stud shaft 6. The upper end of the bar 20 is longitudinally slotted to receive the outer end of the shaft 16, whereby such shaft acts as a guide for the reciprocatory movements of the bar. The shaft 16 at one side of the bar 20 is provided with a ratchet wheel 21 and has fingers 22 and 23 pivotally projected in opposite directions therefrom at opposite sides of the ratchet wheel with each finger carrying a respective pawl 24, 25 on a pin 30 projecting therefrom, a coiled spring 31 encircling each pin and acting upon the respective pawl to normally hold it in engagement with the ratchet teeth and in the direction of intended turning movement of the ratchet wheel. The bar 20 is connected to each finger 22, 23 by a respective link 26, which is pivoted at one end to the finger and at its other end to the bar whereby rocking movements are imparted to the finger and to the pawls carried thereby from the bar 20 upon a reciprocation thereof. It is evident that on an upward movement of the bar 20 the pawl 24 will engage the ratchet wheel to impart forward movements thereto and that upon a downward movement of the bar the pawl 25 will act to impart forward movements to the ratchet wheel, so that the feed shaft has intermittent feeding movements imparted thereto upon a turning of the crank shaft 6.

The discharge opening of the container 13 is provided with a shutter or slide valve 27, which may be moved to open or close the discharge opening as is apparent by reference to Fig. 7.

In use the apparatus is intended to be suspended by straps from the shoulders of a person carrying the same, with the crank handle 8 located in convenient position to be turned by the right hand of the operator. To container 13 being filled, the operator passes along the plants or other objects to be sprayed and a turning of the crank will effect both a feeding of powder from the container into the fan housing, by reason of the driving connection between the crank shaft and forward shaft, and a rapid turning of the fan 2 to discharge the powder with considerable force from the housing through the discharge outlet 10 and nozzle 11 by which latter, if of the fan type, it is discharged over quite a broad area. The air admitted to the fan housing passes through openings 28 in a side thereof and the amount of air admitted may be regulated by the adjustment of shutter plates 29 with respect to said opening, these plates are adjustably carried by pins 32 projecting from the housing through slots 33 in the plates.

It is found in practice that this invention provides a simple and highly efficient powder gun, which is capable of being easily operated and of discharging an effective spray of powder therefrom.

I wish it understood that my invention is not limited to any specific construction, arrangement or form of the parts as it is capable of numerous modifications and changes without departing from the spirit of the claims.

Having thus described my invention, what I claim as new and desire to secure by Letters Patent, is,—

1. In a powder gun, a powder container having a discharge opening in its bottom portion, a curved screen mounted over said opening, an agitating wheel of wire construction mounted in the housing over the opening for peripheral engagement with the screen, a fan housing having inlet and outlet openings with its inlet opening in registry with the discharge opening of the container, rotatable means operable to drive the fan and having an eccentric, and means connecting the eccentric and agitating wheel and operable by rotation of the eccentric to impart successive rotary movements to the wheel.

2. In a powder gun, a fan housing having inlet and discharge openings, a fan mounted in the housing, a shaft in driving connection with the fan and having an eccentric portion, a crank mounted on the shaft to turn the same, a powder container mounted on the housing and having a screened discharge opening in registry with the inlet opening of the housing, rotatable feed means disposed within the bottom portion of the container and operable to facilitate a feeding of powder from the container into the housing, and ratchet means operated from the eccentric of the crank shaft to impart intermittent feeding movements to the feed means when the crank shaft is turned.

3. In a powder gun, a fan housing having inlet and discharge openings, a fan in the housing, a powder container mounted on the top of the housing and having a trough-like bottom transverse to the housing and extending at one end beyond a side of the housing, said container having a screened discharge opening in its bottom through a portion of the trough and in registry with the inlet opening of the housing, a feed shaft mounted in the bottom of the container lengthwise of the trough thereof and having a feed worm over the trough and a feed wheel over its discharge opening in coaction with its screen, the feed wheel being of wire construction, a ratchet wheel on the feed shaft without the casing, a pair of pawls carried for rocking movements by the shaft and in actuating engagement with the ratchet wheel at opposite sides of its axis, a crank shaft having driving connection with the fan and having an eccentric portion, an eccentric bar connecting the crank shaft eccentric and the pawls to impart ratchet actuating movements to first one and then the other of the pawls when the crank shaft is rotated, and a crank carried by the shaft.

4. In a powder gun, a fan housing having inlet and outlet openings, a fan in the housing, a shaft in driving connection with the fan and having an eccentric stud, a crank carried by said stud for revoluble adjustment thereon, a powder container mounted on the housing and having a discharge opening in registry with the inlet opening of the housing, feed means in the housing having a carrying shaft, and ratchet means connecting the feed means shaft and the fan driving shaft eccentric to impart intermittent rotation to the former when the latter is driven.

In testimony whereof, I have hereunto signed my name to this specification.

JOSEPH L. SKELDON.